US012522805B2

United States Patent
Keophiphath et al.

(10) Patent No.: US 12,522,805 B2
(45) Date of Patent: Jan. 13, 2026

(54) METHOD FOR OBTAINING CELL SPHEROIDS

(71) Applicant: D.I.V.A EXPERTISE, Toulouse (FR)

(72) Inventors: Mayoura Keophiphath, Toulouse (FR); Chloe Belles, Toulouse (FR); Aurelie Gomes, Toulouse (FR); Marine Norlund, Toulouse (FR)

(73) Assignee: D.I.V.A EXPERTISE, Toulouse (FR)

( * ) Notice: Subject to any disclaimer, the term of this patent is extended or adjusted under 35 U.S.C. 154(b) by 945 days.

(21) Appl. No.: 17/769,013

(22) PCT Filed: Oct. 19, 2020

(86) PCT No.: PCT/FR2020/051878
§ 371 (c)(1),
(2) Date: May 23, 2022

(87) PCT Pub. No.: WO2021/074556
PCT Pub. Date: Apr. 22, 2021

(65) Prior Publication Data
US 2024/0101968 A1    Mar. 28, 2024

(30) Foreign Application Priority Data
Oct. 17, 2019 (FR) .................................. 1911597

(51) Int. Cl.
*C12N 5/071* (2010.01)
*C12N 5/077* (2010.01)

(52) U.S. Cl.
CPC ......... *C12N 5/0697* (2013.01); *C12N 5/0653* (2013.01); *C12N 2500/24* (2013.01); *C12N 2501/30* (2013.01); *C12N 2501/33* (2013.01); *C12N 2513/00* (2013.01)

(58) Field of Classification Search
None
See application file for complete search history.

(56) References Cited

U.S. PATENT DOCUMENTS

2018/0355322 A1* 12/2018 Tsukamoto .......... C12N 5/0693

FOREIGN PATENT DOCUMENTS

WO    WO 2016/069892 A1    5/2016

OTHER PUBLICATIONS

Ivascu, Andrea, and Manfred Kubbies. "Rapid generation of single-tumor spheroids for high-throughput cell function and toxicity analysis." SLAS Discovery 11.8 (2006): 922-932. (Year: 2006).*

Lee et al, Formation of size-controllable spheroids using gingiva-derived stem cells and concave microwells: Morphology abd viability tests, Biomedical reports, 2016, 4(1), 97-101.

Markway et al, Enhanced Chondrogenic Differentiation of Human Bone Marrow-Derived Mesenchymal Stem Cells in Low Oxygen Environment Micropellet Cultures, Cell transplantation, 2010, 19(1), 29-42.

Achilli et al, Advances in the formulation, use and understanding of multicellular speroids, Expert opinion on biological therapy, 2012, 12(10), 1347-1360.

Turner et al, Three-Dimensional Spheroid Cell Model of In Vitro Adipocyte Inflammation, Tissue engineering, 2015, 21 (11-12), 1837-1847.

Ho et al., Low Resolution Solution Structure of HAMLET and the Importance of Its Alpha-Domains in Tumoricidal Activity, PLOS one, 2012, vol. 7, 1-12.

Emont et al., Using a 3D Culture System to Differentiate Visceral Adipocytes In Vitro, Endocrinology. Dec. 2015; 156 (12): 4761-4768.

Daya et al., Culture and differentiation of preadipocytes in two-dimensional and three-dimensional in vitro systems, Differentiation (2007) 75:360-370.

Louis et al., A biomimetic hydrogel functionalized with adipose ECM components as a microenvironment for the 3D culture of human and murine adipocytes, Biotechnol Bioeng, 2017, vol. 114, 1-29.

Borges et al., In vitro analysis of the interactions between preadipocytes and endothelial cells in a 3D fibrin matrixMimimally Invasive Therapy & Allied technologies, 2007, vol. 16:3, 141-148.

Korff & Augustin, Integration of Endothelial Cells in Multicellular Spheroids Prevents Apoptosis and Induces Differentiation, Journal of Cell Biology, 1998, vol. 143, 1341-1352.

Turner et al., A surface-tethered spheroid model for functional evaluation of 3T3-L1 adipocytes, Biotechnologies & Bioengineering, 2013, vol. 111.

Bhang & Cho, Angiogenesis in ischemic tissue produced by spheroid grafting of human adipose-derived stromal cells, Biomaterials 32 (2011) 2734e2747.

Klingelhutz A.J. et al. Scaffold-free generation of uniform adipose spheroids for metabolism research and drug discovery, 2018 ; Nature Scientific Reports—8 :523.

Dani et al, Monsieur Hyde Obésité et Docteur Jekyll Médecine régénérative » (Med Sci (Paris). Nov. 2006; 22 (11): 928-929.

Brun, Altération de la différenciation adipogénique des fibroblastes 10 dermiques avec l'âge, Annales de Dermatologie let de Vénéréologie vol. 143, Issue 12, Supplement, Dec. 2016, p. S432.

* cited by examiner

*Primary Examiner* — Tracy Vivlemore
*Assistant Examiner* — Fatimah Khalaf Matalkah
(74) *Attorney, Agent, or Firm* — Arrigo, Lee, Guttman & Mouta-Bellum LLP

(57) ABSTRACT

The invention relates to a method for obtaining spheroids of differentiated cells, in particular of adipocytes without an exogenous matrix. These spheroids are particularly suitable for carrying out metabolic studies on test compounds by mimicking as well as possible the functioning of an organ in vivo such as adipose tissue, for example.

20 Claims, 1 Drawing Sheet

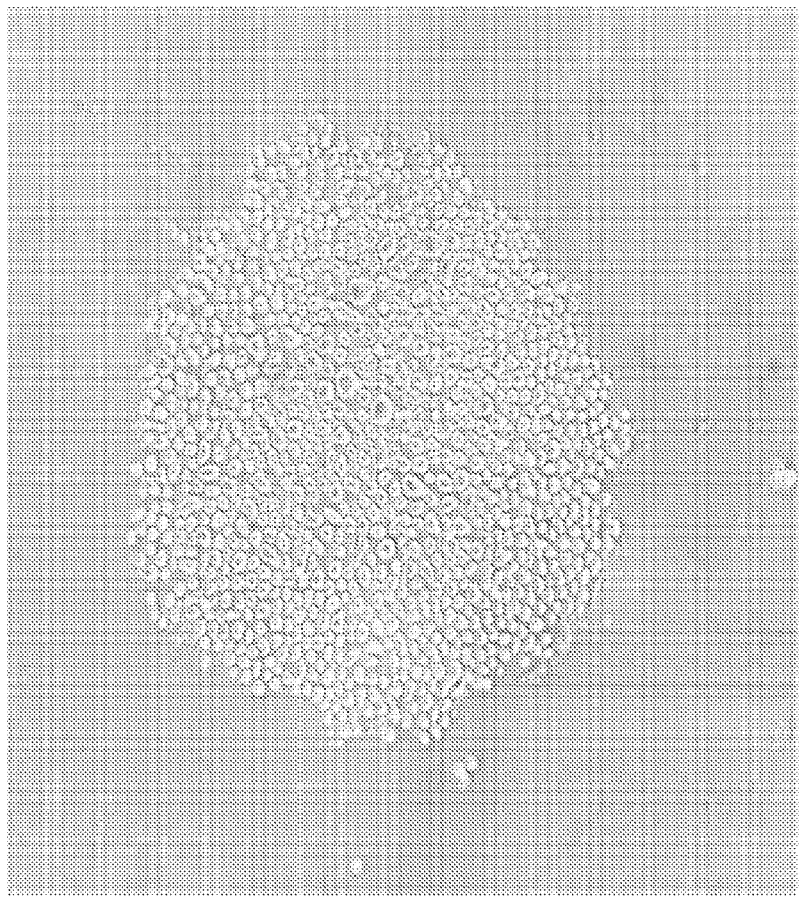

METHOD FOR OBTAINING CELL SPHEROIDS

The present invention concerns the field of cell culture, in particular three-dimensional cell culture and the methods and uses thereof.

Toxicological studies on the basis of two-dimensional cell studies have been used to examine the effects of medicaments on cellular metabolism, enzyme activity etc.

Although the ability to grow cells in flat layers is simple and allows studying various aspects of cell physiology, they do not make it possible to account for the complexity and the architecture of an entire organ. In particular, in a 2D model, the extracellular matrix and interactions between cells and with the matrix, which would reflect the complexity of cellular functions, are absent. Three-dimensional cell culture systems can form a functional tissue having characteristics close to in-vivo structures. Three-dimensional cell culture allows cells to interact with their environment in three dimensions and better reflect the integrated operation of an organ.

The health, nutrition, cosmetics and aesthetics industries are facing changes in their environment. On the one hand, the increased stringency of regulations, for example prohibiting animal testing in cosmetics, and on the other hand, the evolution of consumer expectations towards more effective products, with scientifically proven results, motivate manufacturers to find new ways to innovate and develop more relevant tools to assess their products, understand their mechanisms of action and optimize their effectiveness.

Other three-dimensional models such as spheroid models of the liver have been described. Hepatic spheroids can be composed of several types of cells initially used in two-dimensional cultures to test xenobiotic molecules as well as their hepatic metabolism.

3D cell culture can produce specific tissue and cell structures and imitate the functions and responses of real tissue to external internal in a more relevant way than two-dimensional cell cultures.

The reproducible production of 3D cell spheroids is very difficult. Up until know, different techniques (based on protein or polysaccharide scaffolds or via chemical inducers) have been used for the formation of spheroids. The liquid overlay technique (LOT) is one of the most explored methodologies, due to its low cost and easy manipulation. This technique was widely studied in order to improve its potential application in high-throughput analysis.

In a particular field, and in particular in the face of the progression of overweight problems and the accelerated aging of the population, the adipose tissue known as fat, which is the site of major alterations during these physiopathological processes, has become one of the major targets of industrial research.

Manufacturers now consider research on adipose tissue as an area for innovation and increasingly want to integrate it into the development of their products in order to gain a competitive advantage on the market.

Adipose tissue is a tissue of very great cellular heterogeneity, especially containing mature adipocytes responsible for the storage of lipids and their release during energy needs, as well as precursors of these cells, the preadipocytes, which will be recruited for the formation of new adipocytes and which contribute to tissue changes during obesity and aging.

Preadipocytes, unlike adipocytes, are cells with adhesive properties and are easy to culture under standard cell culture conditions in two-dimensional systems. In return, these 2D culture conditions require a large number of cells and non-negligible material resources, a long culture time (two weeks) without permitting optimum maturation of these cells and with an additional substantial risk of detachment of cells at the end of culture.

Thus, the preadipocyte has become a target of action for health and beauty products given its role in the expansion of adipose mass and in fibro-inflammatory processes which characterize adipose deposits in overweight individuals, areas of cellulite or even aged skin.

In the case of preadipocytes, cultures in existing 3D systems most often integrate a collagen-type protein matrix or involve complex and expensive techniques.

Ho & al., PLOS one, 2012, vol. 7, describe the formation of cancer cell spheroids by the liquid overlay cultivation technique.

Emon M P et al., Endocrinology; 2015 December, describes a simple and reproducible technique for 3D cell culture that makes it possible to differentiate mouse visceral preadipocytes into adipocytes. Preadipocytes are integrated into a collagen gel at a concentration of 300,000 cells per well for 500 µl of gel.

Daya S et al., Differentiation, 2007, p 360-370, describes the use of a three-dimensional cell culture system for the culture and differentiation of mouse preadipocytes contained in a collagen gel. Cells were added to the gel so as to contain 105 cells/ml of gel then the mixture is deposited in a 24-well plate. A 13-mm glass coverslip is deposited at the bottom of the well to remove the collagen gel more easily at the end of differentiation.

Louis F, Biotechnol Bioeng, 2017, volume 114, discloses the use of a bio-functionalized hydrogel containing components of the adipose extracellular matrix such as collagen I, collagen VI and the cell-binding domain of fibronectin, which allows the 3D culture of mature adipocytes derived from cell lines of pre-adipocytes, acquiring an in-vivo type organization by forming multicellular spheroids of adipocytes.

J. Borges, Minimally Invasive Therapy & Allied technologies, 2007, volume 16, describes a method for endothelial cell co-culture to make it possible to study their interactions in a context of proliferation and angiogenesis. Preadipocytes and endothelial cells have been 3D cultured within a fibrin matrix on 96-well nonadherent plates (with concave round bottom) to allow them to be grouped into spheroids.

In Korff & Augustin, Journal of Cell Biology, 1998, volume 143, the technique used to generate endothelial cells is a chemical method. Indeed, the Material and Methods section of this document describes the suspension of cells on culture plates, in culture medium that contains methocel (20%) under temperature conditions of 37° C., 5% $CO_2$ and 100%. These conditions allow the cells to aggregate in less than 4 hours. It is stated that "Variation of the methocel concentration during spheroid formation was, thus, used to control the average size of the spheroids", which confirms the fact that methocel is the agent used to form the spheroids obtained in this document.

Turner, Biotechnologies & Bioengineering, 2013, volume 111, describes a 3D cell culture model of preadipocyte cells that will be induced into differentiation to become adipocytes. This 3D culture of pre-adipocytes is done n plates of 24 round wells with a flat bottom with a substrate composed of an artificially manufactured polymer: "elastin-like-polypeptide (ELP)" combined with another synthetic polymer: "polyethyleneimine (PEI)".

Bhang & Cho, Biomaterials, 2011, vol. 32 p. 2734-374, relates to the increased efficacy of angiogenesis following the graft of spheroids formed from stem cells in an ischemic tissue. The spheroids are obtained by placing the cell culture in a vessel that undergoes stirring at approximately 70 rpm for 3 days. This document describes obtaining spheroids by a mechanical inducer that is found to be stirring the vessel for several days.

WO2016069892 A1 describes a system enabling the culture of 3D cells such as spheroids. This system corresponds to a plate composed of micro-wells or wells that have a shape enabling the formation of spheroids when the cells are cultured, contained in a culture device such as a culture vessel. Furthermore, they are structured and arranged to allow the movement of liquid within and outside the wells without trapping air between the substrate and the liquid or the lipid droplets that are introduced into the wells by means of their capillary structures. Generally, the techniques described in the state of the art involve either the use of chemical spheroidization inducers, exogenous matrix support (scaffold), or complex or time-consuming techniques requiring several days of manipulation to obtain the spheroids.

The present invention thus seeks to provide a simple and rapid method to obtain spheroids of undifferentiated and/or differentiated cells, in particular preadipocyte spheroids or even adipocyte spheroids.

The present invention provides a vital tool to study the impact of compounds in a three-dimensional cell culture system that is closer to, and should therefore be more predictive of, the clinical situation and offers a unique, simple and inexpensive three-dimensional solution. Thus, according to a first embodiment, the present invention provides a method for obtaining spheroids of undifferentiated cells comprising the following steps:

a. Inoculating isolated and amplified undifferentiated cells into a container whose bottom has a rounded concave profile, containing a suitable culture medium,
b. Centrifuging said container,
c. Rotating the container along an axis perpendicular to the plane defined by the surface of the culture medium, the rotation being from 160 to 200°, advantageously 180°.
d. Repeating steps b) and c) between 1 and 15 times,
e. Inoculating and incubating the newly formed spheroids of undifferentiated cells into a medium promoting complete spheroid formation, especially a medium supplemented with foetal serum.

According to one embodiment, the method is characterized in that said undifferentiated cells are not human embryonic cells.

The first step consists of or comprises the inoculation of isolated and amplified undifferentiated cells.

Undifferentiated cells means undifferentiated or poorly differentiated cells found within tissues that are composed predominantly of differentiated cells in most adult tissues and organs. Undifferentiated cells are thus opposed to completely differentiated cells. Thus, for example, in the context of the invention, adipocytes are completely differentiated cells and preadipocytes are undifferentiated cells because they are not completely differentiated due to being engaged in a process that has not been completed.

It is likewise for fibroblasts, which are actually undifferentiated cells as indicated in the document "Altération de la différenciation adipogénique des fibroblastes dermiques avec l'âge [Alteration of adipogenic differentiation of dermal fibroblasts with age]", Annales de Dermatologie et de Vénéréologie Volume 143, Issue 12, Supplement, December 2016, Page S432) which concludes that: fibroblasts, by their ability to differentiate into adipocytes, contribute to the renewal of adipose tissue". Finally, with regard to cells of the stromal vascular fraction, these cells also constitute undifferentiated cells, within the meaning of the present invention, as indicated in "Le tissu adipeux: Monsieur Hyde Obésité et Docteur Jekyll Médecine régénérative [Adipose tissue: Mr Hyde Obesity and Dr Jekyll regenerative medicine] (Med Sci (Paris). 2006 November; 22(11): 928-929) when the authors indicate that " . . . the stromal fraction of adipose tissue contains a gradient of progenitor cells with different differentiation potentialities".

These undifferentiated cells are generally multipotent cells, in particular they are mesenchymal stem cells. Mesenchymal stem cells can give rise to adipocytes, osteocytes and chondrocytes. They are able to give rise to different cell lines of a given tissue. These multipotent stem cells are present in the embryo or in the adult organism; they are the origin of several types of differentiated cells but retain their ability to renew themselves.

Mesenchymal stem cells can give rise to several types of cells and they are already committed in a certain direction. Their potential is therefore more limited than that of embryonic stem cells. Mammalian hematopoietic cells, for example, give rise to red blood cells, platelets, T or B cells or macrophages, but they can not give rise to muscle cells. Another example of multipotent stem cells is given by cells of the neural crest that emigrate from the neural tube during embryogenesis and which especially give rise to melanocytes, neurons and glial cells of the peripheral nervous system.

According to a more particular embodiment of the invention, the undifferentiated cells are preadipocytes.

Preadipocytes are undifferentiated or poorly-differentiated cells arising mesenchymal stem cells and can be stimulated to give rise to adipocytes, which are completely differentiated cells.

According to a more particular embodiment of the invention, the undifferentiated cells are fibroblasts.

According to another more particular embodiment of the invention, the undifferentiated cells are cells of the vascular stromal fraction of adipose tissue.

According to an embodiment of the invention, the undifferentiated cells originate from one or more human individuals, in particular adults.

According to an embodiment, the undifferentiated cells are derived from biopsies or plasties of human tissue, more particularly of human adipose tissue or even a product of liposuction.

According to another embodiment, it is skin tissue, comprising the dermis. These products are typically classified as surgical waste.

The method according to the invention is therefore not a medical or surgical method.

According to a particular and preferential embodiment, the undifferentiated cells are not embryonic undifferentiated cells.

Step a) of the method according to the invention provides the inoculation, into a suitable culture medium, of isolated and amplified undifferentiated cells in a container whose bottom has a concave rounded profile.

The suitable culture medium is a culture medium that allows the survival of cells and contains nutritional elements specific to the type of cell.

For example, a suitable culture can be a EMEM or DEMEM medium supplemented with foetal serum, in particular foetal calf serum (in particular approximately 10% by mass) or ECBM supplemented with serum albumin, in particular bovine (for example approximately 3% by mass). It may also be rich medium for mammalian cell culture and preferably such that it contains amino acids such as alanine, asparagine, glutamic acid, and proline; vitamins such as B8 and B12, fatty acids such as linoleic and lipoic acid, and nitrogenous bases such as thymidine; it may preferably be the DMEM/F12 medium sold by Life Technologies or the ECBM medium sold by Promocell.

In the case where the undifferentiated cells are preadipocytes, the appropriate culture medium is a medium such as EMEM or DMEM enriched with foetal serum, in particular foetal calf serum. An Eagle's minimal essential medium (EMEM) is a cell culture medium developed by Harry Eagle and used to provide the nutritional elements necessary for maintenance and proliferation of different types of cells in vitro. Such a medium contains amino acids, salts (potassium chloride, magnesium sulphate, sodium chloride and sodium dihydrogen phosphate), glucose and vitamins (folic acid, nicotinamide, riboflavin and vitamin B12, for example). There is a variation of EMEM, Dulbecco/Vogt modified Eagle's minimal essential medium (DMEM). This medium contains approximately four times more vitamins and amino acids than in the original formula and two to four times more glucose. Moreover, it also contains iron. DMEM medium is appropriate for almost all types of cells, comprising human, monkey, hamster, rat, mouse, poultry and fish cells.

The container of step a) is a container whose bottom has a concave rounded profile.

The inventors have actually observed that the formation of spheroids via centrifugation steps b) and c) as well as the repetition of these steps, was obtained by the combination of this alternating centrifugation/rotation of the inoculation container with the concave rounded profile. For example, such a container whose bottom has a concave rounded profile corresponds to a well such as those found on cell culture plates comprising a plurality of wells, in particular 96-well culture plates. Corning® ULA microplate culture plates comprising 96 or 384 wells can advantageously be mentioned, for example.

Advantageously, the container has a "low attachment" or ultra-low attachment" treatment in order to reduce cell adhesion.

Step b) of the method according to the invention comprises centrifugating said container. Step c) comprises a rotation of said container by an angle of 160 to 200°, advantageously 180°, along an axis perpendicular to the plane defined by the surface of the cell culture medium contained in the container and perpendicular to it.

These two steps b) and c) are repeated between 1 and 15 times, for example 1 time, 2 times, 3 times, 4 times, 5 times, 6 times, 7 times, 8 times, 9 times, 10 times, 11 times, 12 times, 13 times, even 14 times or 15 times.

Advantageously, the number of repetitions of steps b) and c) is three or even 4, or even 5, even 10, particularly 13 times.

As explained, between each centrifugation, the container, or more preferentially the cell culture plate comprising a plurality of wells, is rotated through an angle of around 160 to 200°, more particularly 180°, along an axis perpendicular to the plane defined by the surface of the culture medium which is contained in said container, the axis of rotation passing through said plane. This centrifugation can be done by means of a benchtop centrifuge, particularly a cell culture plate centrifuge comprising a plurality of wells.

Examples include microplate centrifuges, for example a centrifuge provided with a dual-position vertical rotor which handles a broad range of plates. The rotor has plate guides to hold the plates. Another example is the PlateFuge® MicroCentrifuge of the MBI company. This is a centrifuge with a swing-out rotor for microplates. The easily-accessible rotor chambre comprises two plate carriers. This allows plates to be deposited on each carrier. When the centrifuge cover is closed, the rotor accelerates and the centrifugal force flattens the plates in a vertical position.

The process consists of taking the container, for example a 96-well plate with rounded bottom, placing it in the Adhoc support of the centrifuge and performing a first centrifugation for a few minutes. After this first centrifugation, the plate is removed from its carrier and the plate is rotated, for example by 180°, on itself in order to position it again in the Adhoc carrier again and then perform a second centrifugation. These steps are thus repeated 3, 4 or even 5 times, for example, with a rotation of the plate on itself between each centrifugation; i.e., by removing it from the carrier and rotating it, then returning it to the carrier to perform the next centrifugation. The centrifugation step lasts several minutes on average, in particular between 1 and 10 minutes, in particular between 1 and 5 minutes, more particularly still between 1 and 3 minutes. The centrifugation force is comprised between 100 and 500 g for the duration of the centrifugation, in particular at approximately 200 to 400 g, more particularly approximately 200 to 300 g.

According to a particular embodiment of the invention, centrifugation/rotation steps b) and c) are repeated 2 to 10 times, even 2 to 8 times, still more particularly 2 to 6 times, more particularly 2 to 4 times.

The combination of repetitions of centrifugations with a rotation of the container between each centrifugation, associated with the convex rounded bottom allows the formation of spheroids without the addition of a chemical agent or protein or polysaccharide matrix support. In addition, the spheroid formation does not require several days; it is performed in a few minutes or even a few hours.

The newly formed spheroids are then inoculated. Step e) thus aims at the inoculation and incubation of the newly formed undifferentiated cell spheroids in a medium supplemented with foetal serum, in particular foetal calf serum, promoting the complete formation of spheroids. Such a medium can be an EMEM or DMEM medium supplemented with foetal serum, in particular foetal calf serum (in particular around 10% by mass).

Advantageously, the conditions of step e) of incubation of the newly formed undifferentiated cell spheroids correspond to a temperature comprised between 36° C. and 38° C. and preferentially around 37° C. and to a percentage of $CO_2$ between 3 and 6% and preferentially around 5%.

The complete formation of spheroids is controlled by evaluating the shape, integrity and growth of the spheroids by transmitted light plate imaging and area measurement (according to the method described in "Scaffold-free generation of uniform adipose spheroids for metabolism research and drug discovery". Klingelhutz A. J. et al. 2018; Nature Scientific Reports—8: 523). According to one embodiment, the method according to the invention aims to obtain spheroids of differentiated cells comprising abovementioned steps a to e and further comprises the following additional steps:

f. Differentiating the fully formed undifferentiated cell spheroids into differentiated cell spheroids in a differentiation medium, g. Obtaining spheroids of differentiated cells The differentiation step is performed according to standard techniques known to the skilled person and depending on the type of cell.

According to a particular embodiment, the method according to the invention is characterized in that the undifferentiated cells are preadipocytes, the differentiated cells are adipocytes and the medium of step e) leading to the differentiation of preadipocyte spheroids to adipocyte spheroids comprises a buffer, a corticosteroid, a phosphodiesterase inhibitor, an antidiabetic, an iron scavenger, and at least one hormone.

In particular, the medium is a mixture of Hepes, insulin, T3, Dexamethasone, transferrin, rosiglitazone and IBMX.

Thus, in a particular embodiment where the method according to the invention aims to obtain adipocyte spheroids, the method according to the invention is characterized in that the buffer is chosen in the group comprising bicarbonate and Hepes, preferentially Hepes at a concentration comprised between 5 and 30 nM, preferentially between 10 and 20 mM.

According to a particular embodiment where the method according to the invention aims to obtain adipocyte spheroids, the method according to the invention is characterized in that the hormone is chosen in the group comprising insulin and thyroid hormone T3, alone or in mixture, preferentially in mixture, at concentrations comprised between 10 and 100 nM, preferentially between 30 and 60 nM for insulin and between 0.1 and 2 nM, preferentially between 0.5 and 1.5 nM for thyroid hormone T3.

According to a particular embodiment where the method according to the invention aims to obtain adipocyte spheroids, the method according to the invention is characterized in that the corticosteroid is chosen in the group comprising betamethasone, dexamethasone cortivazol and mixtures thereof, preferentially Dexamethasone at a final concentration comprised between 50 and 200 nM, preferentially between 80 and 120 nM.

According to a particular embodiment where the method according to the invention aims to obtain adipocyte spheroids, the method according to the invention is characterized in that the iron scavenger/transporter, especially transferrin, is at a concentration comprised between 0.01 and 0.2 µg/ml, preferentially between 0.05 and 0.15 µg/ml.

According to a particular embodiment where the method according to the invention aims to obtain adipocyte spheroids, the method according to the invention is characterized in that the antidiabetic is chosen in the group comprising pioglitazone, rosiglitazone, troglitazone and mixtures thereof, preferentially rosiglitazone at a final concentration comprised between 50 and 200 nM, preferentially between 80 and 120 nM.

According to a particular embodiment where the method according to the invention aims to obtain adipocyte spheroids, the method according to the invention is characterized in that the non-selective phosphodiesterase inhibitor is chosen from the group comprising caffeine, theophylline, 3-isobutyl-1-methylxantine (IBMX) and mixtures thereof, preferentially IBMX at a concentration comprised between 5 and 35 µM, preferentially between 15 and 25 µM.

The spheroids obtained have a diameter comprised between 80 and 200 µm, even between 100 and 200 µm, particularly between 110 and 190 µm, more particularly between 120 and 160 µm, depending on the stage of maturity and/or differentiation.

Indeed, the spheroids obtained according to the invention constitute an optimal model because they are made from primary cell cultures, i.e., cell cultures that are derived directly from fresh human tissues and placed under conditions that best mimic the physiological conditions found in vivo in the human body. The size of the spheroids allows the diffusion of oxygen, and other gases as well as nutrients to the core of the spheroid, which makes it possible to maintain all the cells from the periphery to the centre in a state of adequate oxygenation and nutrition as close as possible to in-vivo conditions. With spheroids or non-spherical particles of several hundred µm, cells necrose due to lack of oxygenation or nutrients not reaching them. This is opposed to models implementing so-called "immortalized" cells. The metabolism of these cells is artificially modified to facilitate their handling and the variability of the results which, in return generate different characteristics, further from living cells and introduces a bias in studies.

Moreover, the absence of exogenous matrix for the formation of these spheroids further reinforces this technical and biological advantage since any study on the matrix remodeling processes of these cells will not be biased by foreign components added for the formation of the spheroids.

The spheroids obtained according to the invention can advantageously be used for biological and product screening protocols, i.e. either to highlight a biological effect of a given product or to identify a product of interest from a bank of test products. As discussed below, their shape and size allow the product to be tested to reach all the cells and the results obtained are even closer to the physiological reality in vivo.

The invention thus aims to use the spheroids thus obtained according to the invention for purposes of evaluating test compounds.

The present invention therefore provides a method for evaluating the pharmacological properties of test compounds comprising the following steps:

a. Implementing a method according to the invention in order to obtain spheroids of differentiated cells;

b. Contacting a test compound with the spheroids;

c. Evaluating the impact of the test compound on at least one physiological or morphological parameter of the cells of the spheroids.

In a particularly advantageous manner, the spheroids according to the invention allow studies of test compounds in various fields, whether in the cosmetics sector to evaluate compounds or active ingredients aimed at weight and figure management, anti-aging or anti-pollution products or even products focused on the quality of the skin and hair.

The nutritional health sector is also concerned with regard to dietary supplements with properties similar to those relating to the cosmetics field as well as products relating to sports nutrition or even immune defences.

Finally, the pharmaceutical sector is also particularly targeted with products targeting the phenomena of overweight, obesity or even the associated metabolic disorders such as diabetes, for example.

Still more advantageously, the spheroids according to the invention can be used in the field of aesthetic medicine in order to evaluate fillers such as fillers comprising polysaccharide or protein organic polymers, for example.

DESCRIPTION OF THE FIGURES

FIG. 1 shows a photo of the spheroids obtained according to the method of Example 1, after step 7, i.e., two days after inoculation, just before starting differentiation.

EXAMPLES

Example of the Method for Obtaining Preadipocyte Spheroids

Principle:

Inoculating human preadipocytes isolated from adipose tissue to form spheroids.

Materials:
- 96-well round bottom plate (7007—Costar)
- Preadipocyte culture medium at 37° C. (DMEM with 10% Foetal Calf Serum (FCS) 1% PS)
- Microscope
- Centrifuge

Abbreviations

DMEM: Dulbecco's Modified Eagle Medium

Beforehand

The preadipocytes are isolated from human adipose tissue derived from biopsies or plasties of human adipose tissue or even the production of liposuction.

The tissue is cut and ground or aspirated with a broken-tip pipette to ensure cell separation. A collagenase solution is added to facilitate cell separation. The cells are drawn off, avoiding the blood and/or the layer of oil which may have formed following the bursting of the adipocytes. The cells are washed with PBS and undergo several centrifugation/washing steps, at approximately 300 to 500 g, to eliminate cellular debris and red blood cells. The cells are washed with PBS. After two centrifugation/washing steps, the cell pellet is suspended in the preadipocyte culture medium. The cells are then inoculated into a T175 vessel in an amount of 5 to 10 million cells per vessel. The next day, the cells are then washed with PBS and returned to culture with the preadipocyte culture medium. At confluence, the cells are treated with trypsin to separate them and then the preadipocyte culture medium is added to neutralize the action of the enzyme and the cells are resuspended. They are ready for the protocol for obtaining spheroids.

Protocol for Obtaining Spheroids:
1—In a 96-well round-bottom plate, inoculate the preadipocytes at 1000 cells per well in 150 µL of 10% FCS DMEM medium
2—Centrifuge the plate at 200 g for 2 minutes at ambient temperature
3—Rotate the plate on itself by 180°, and
4—Repeat step 2) and step 3) four times.
5—After the centrifugations, check that the preadipocytes have aggregated well (start of spheroid formation) and incubate at 37° C. with 5% $CO_2$ for one night.
6—The next day, verify that spheroids have properly formed
7—Two days after inoculation, start the differentiation treatment (Table 1 below for the preparation of the basic medium and Table 2 below for the differentiation medium). The medium is gently deposited at the edges of the wells so as not to disintegrate the spheroid.

Table 1: Basic Medium for Differentiation.

TABLE 1

| | Final concentration |
|---|---|
| DMEM/F12 without phenol red | QS |
| Biotin | 33 µM |
| Calcium Pantothenate | 17 µM |
| Penicillin - Streptomycin | 1% (100 U/mL) |
| Stabilized glutamine | 2.5 mM |

Table 2: Differentiation Medium

TABLE 2

| | Volume | Final concentration in the wells |
|---|---|---|
| Basic medium | 10 mL | |
| Hepes | | 10 to 30 mM |
| Insulin | | 30 to 80 nM |
| T3 | | 0.5 to 2 nM |
| Dexamethasone | | 80 to 150 nM |
| Transferrin | | 0.05 to 2 µg/ml |
| Rosiglitazone | | 50 to 120 nM |
| IBMX | | 10 to 30 µM |

7—Change the medium every 2 to 3 days and observe the spheroids every day to check that they are acting properly.

8—Discontinue differentiation if the spheroids start to disintegrate.

The spheroids of undifferentiated preadipocyte cells obtained and comprising approximately 1000 cells are visible in FIG. 1. A properly spherical formation is noted in the cell cluster.

Table 3 below illustrates the size (diameter in µm) of the spheroids obtained according to the method of the example, with variable quantities of cells at inoculation, at the end of the method (3 days after inoculation) and a few days after (7 days after inoculation)

TABLE 3

Size of spheroids obtained according to the method (diameter in um and standard deviation) and according to the number of cells at inoculation and after 3 or 7 days post-inoculation.

| | | Diameter in µm (Number of cells at inoculation) | | | | | | | |
|---|---|---|---|---|---|---|---|---|---|
| | | Diameter (1-1000) | Standard deviation | Diameter (2-1000) | Standard deviation | Diameter (1-2000) | Standard deviation | Diameter (2-2000) | Standard deviation |
| Days post inoculation | 3 | 126 | 7.5 | 120 | 7 | 150 | 8 | 155 | 8.5 |
| | 7 | 110 | 5.2 | 124 | 5 | 128 | 10 | 140 | 9.5 |

The invention claimed is:

1. A method for obtaining spheroids of undifferentiated cells comprising the following steps:

a. Inoculating isolated and amplified undifferentiated cells into a container whose bottom has a rounded concave profile, containing a suitable culture medium,
b. Centrifuging said container,
c. Rotating the container along an axis perpendicular to the plane defined by the surface of the culture medium, the rotation being from 160 to 200°,
d. Repeating steps b) and c) between 1 and 15 times,
e. Inoculating and incubating the newly formed spheroids of undifferentiated cells into a medium promoting complete spheroid formation,
wherein said undifferentiated cells are not human embryonic cells.

2. The method according to claim 1 comprising the following additional steps:
f. Differentiating the fully formed undifferentiated cell spheroids into differentiated cell spheroids in a differentiation medium,
g. Obtaining spheroids of differentiated cells.

3. The method according to claim 1, wherein the undifferentiated cells are drawn from one or more individual humans.

4. The method according to claim 1, wherein the container is a well with a concave rounded bottom profile comprised in a cell culture device.

5. The method according to claim 1, wherein the concentration of cells inoculated into the container corresponds to a quantity of cells per container comprised between 500 and 1500.

6. The method according to claim 1, wherein the duration of each centrifugation is between 1 and 3 minutes, with a centrifugation force comprised between 200 and 500 g.

7. The method according to claim 1, wherein the conditions of step e) of incubation of the newly formed undifferentiated cell spheroids correspond to a temperature comprised between 36° C. and 38° C. and to a percentage of $CO_2$ between 3 and 6%.

8. The method according to claim 2, wherein the undifferentiated cells are chosen in the group consisting of preadipocytes, fibroblasts and precursor cells of the vascular stromal fraction of adipose tissue.

9. The method according to claim 2, wherein the undifferentiated cells are preadipocytes, the differentiated cells are adipocytes and the medium of step f) leading to the differentiation of preadipocyte spheroids to adipocyte spheroids comprises a buffer, a corticosteroid, a phosphodiesterase inhibitor, an antidiabetic, an iron scavenger, and at least one hormone.

10. The method according to claim 9, wherein the buffer is selected from bicarbonate or (and) Hepes, at a concentration comprised between 5 and 30 nM.

11. The method according to the claim 9, wherein the hormone is selected from insulin or thyroid hormone T3, alone or in mixture, at concentrations comprised between 10 and 100 nM.

12. The method according to claim 9, wherein the corticosteroid is selected from betamethasone, dexamethasone cortivazol or mixtures thereof (,) at a final concentration comprised between 50 and 200 nM.

13. The method according to claim 9, wherein the iron scavenger/transporter is at a concentration comprised between 0.01 and 0.2 µg/ml.

14. The method according to claim 9, wherein the antidiabetic is selected from pioglitazone, rosiglitazone, troglitazone and mixtures thereof, at a final concentration comprised between 50 and 200 nM.

15. The method according to claim 9, wherein the non-selective phosphodiesterase inhibitor is selected from caffeine, theophylline, 3-isobutyl-1-methylxantine (IBMX) and mixtures thereof at a concentration comprised between 5 and 35 µM.

16. A method for evaluating the pharmacological properties of test compounds comprising the following steps:
a. Implementing a method according to claim 2 in order to obtain spheroids of differentiated cells;
b. Contacting a test compound with the steroids;
c. Evaluating the impact of the test compound on at least one physiological or morphological parameter of the cells of the spheroid.

17. The method according to claim 1, wherein the medium used in step e) is a medium supplemented with foetal serum.

18. The method according to claim 4, wherein the cell culture device is a plate comprising a plurality of wells.

19. The method according to claim 10, wherein the buffer is Hepes at concentration comprised between 10 and 20 mM.

20. The method according to the claim 11, wherein the hormone is a mixture of insulin and thyroid hormone T3, at concentrations comprised between 30 and 60 nM for insulin and between 0.1 and 2 mM for thyroid hormone T3.

* * * * *